(12) United States Patent
Amstutz

(10) Patent No.: US 8,261,931 B2
(45) Date of Patent: Sep. 11, 2012

(54) FLUID TANK HAVING A HEAT-ACTIVATED ADHESIVE JOINT

(75) Inventor: Aaron K. Amstutz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 702 days.

(21) Appl. No.: 12/289,462

(22) Filed: Oct. 28, 2008

(65) Prior Publication Data

US 2010/0102066 A1    Apr. 29, 2010

(51) Int. Cl.
 *B65D 6/28* (2006.01)
 *B65D 8/18* (2006.01)
 *B65D 6/00* (2006.01)

(52) U.S. Cl. ....................... 220/612; 220/4.12

(58) Field of Classification Search ............... 220/4.12, 220/612, 4.13, 4.14
See application file for complete search history.

(56) References Cited

U.S. PATENT DOCUMENTS

| | | | |
|---|---|---|---|
| 2,806,622 A | 9/1957 | Leirer | |
| 2,951,004 A | 8/1960 | Martin et al. | |
| 3,340,224 A | 9/1967 | Sherman et al. | |
| 3,383,004 A * | 5/1968 | Closner | 220/560.12 |
| 3,609,624 A | 9/1971 | Nagy | |
| 3,894,112 A | 7/1975 | Pagel | |
| 3,894,113 A | 7/1975 | Pagel | |
| 4,093,254 A | 6/1978 | Ezaki | |
| 4,131,980 A * | 1/1979 | Zinnbauer | 29/463 |
| 4,135,033 A | 1/1979 | Lawton | |
| 4,268,048 A | 5/1981 | Teraoka et al. | |
| 4,507,340 A | 3/1985 | Rinde et al. | |
| 5,290,883 A | 3/1994 | Hosokawa et al. | |
| 5,340,946 A | 8/1994 | Friedrich et al. | |
| 5,543,214 A | 8/1996 | Groshens et al. | |
| 5,828,033 A | 10/1998 | Mitsuyoshi et al. | |
| 5,976,305 A * | 11/1999 | Bhat et al. | 156/331.4 |
| 6,261,685 B1 | 7/2001 | Hosokawa et al. | |
| 7,037,982 B2 | 5/2006 | Fuchs | |
| 2003/0181558 A1 | 9/2003 | von Hellens | |
| 2004/0204551 A1 | 10/2004 | Czaplicki et al. | |
| 2004/0258937 A1 | 12/2004 | Achten et al. | |
| 2005/0230027 A1 | 10/2005 | Kassa et al. | |
| 2006/0188709 A1 | 8/2006 | Jannic | |
| 2007/0095475 A1 | 5/2007 | Hable et al. | |
| 2007/0284036 A1 | 12/2007 | Sheasley et al. | |
| 2008/0058753 A1 | 3/2008 | Dalal | |

* cited by examiner

*Primary Examiner* — Harry Grosso
(74) *Attorney, Agent, or Firm* — Finnegan, Henderson, Farabow, Garrett & Dunner LLP

(57) ABSTRACT

A fluid tank is disclosed. The fluid tank includes at least one joint including an adhesive that is non-tacky at a first temperature, has a flow point temperature at a second temperature that is greater than the first temperature, and a cure and bond temperature at a third temperature.

17 Claims, 3 Drawing Sheets

US 8,261,931 B2

FLUID TANK HAVING A HEAT-ACTIVATED ADHESIVE JOINT

TECHNICAL FIELD

The present disclosure relates generally to a fluid tank and, more particularly, to a fluid tank having a heat-activated adhesive joint.

BACKGROUND

Machines such as, for example, track-type tractors, wheel loaders, on and off-highway haul trucks, motor graders, and other heavy equipment are used to perform many tasks. To effectively perform these tasks, an engine provides torque to propel the machine and/or to power various hydraulic systems (e.g., implement systems, steering systems, and braking systems). The machine may include various fluid tanks capable of storing fluids required for operation of the engine and/or hydraulic systems. For example, a fluid tank may store a supply of hydraulic fluid for use with the implement systems or air for a brake system.

Typically, the walls of a fluid tank, e.g., a fuel tank, a hydraulic tank, and/or an air brake tank, are welded together using resistance seam welding. Because resistance seam welding creates heat-affected zones that may have a reduced fatigue life, the fluid tank may be designed with extra material in the area of the weld joint or on neighboring surfaces to increase fatigue life. As a result, the fluid tank may be undesirably heavy and/or expensive.

One attempt at reducing the effects of welding in a fluid tank is described in U.S. Pat. No. 5,828,033 (the '033 patent) issued to Mitsuyoski et al. In particular, the '033 patent discloses a tank with upper and lower shell members. The upper and lower shell members have respective flanges that overlap each other. The upper and lower flanges are welded to each other by a laser.

Although laser welding may be suitable for some applications, high frequency vibration induced from engine or implement system operation and low frequency vibrations associated with the travel of the machine over terrain can be transmitted through the machine to the tank. These vibrations can cause the tank wall joints to fatigue over time, and may lead to failure. Furthermore, known high-strength adhesive materials (e.g. epoxies) generally have low elongation-to-failure and, although could be equally effective in bonding a tank together, could not resist the vibrations and resulting elongation at the adhesive joint.

The disclosed fluid tank is directed to overcoming one or more of the shortcomings set forth above and/or other problems in existing technology.

SUMMARY OF THE INVENTION

In one aspect, the present disclosure is directed to a fluid tank. The fluid tank includes at least one joint including an adhesive that is non-tacky at a first temperature, has a flow point temperature at a second temperature that is greater than the first temperature, and a cure and bond temperature at a third temperature.

In another aspect, the present disclosure is directed to a method of assembling a fluid tank. The method includes positioning an adhesive that is non-tacky at first temperature with respect to a first wall and a second wall. The method further includes heating the adhesive above a second temperature at which the adhesive flows, and heating the adhesive to a third temperature to form a structural bond between the first wall and the second wall.

In yet another aspect, the present disclosure is directed to a fluid tank. The fluid tank includes a first member, a second member, and a joint. The joint includes an adhesive that is non-tacky at a temperature below a flow point temperature of the adhesive and forms a first bond between the first and second members upon heating to a third temperature.

DETAILED DESCRIPTION

Figure 1:
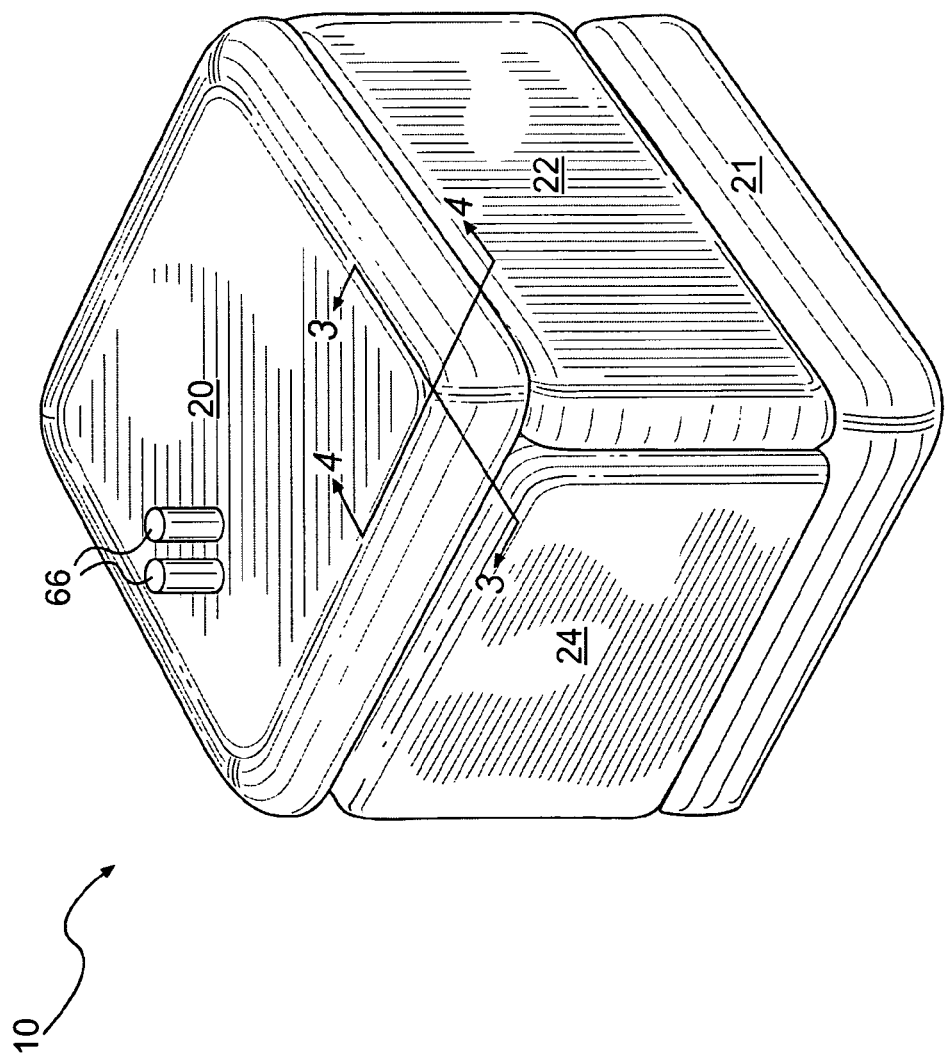
FIG. 1 is an isometric pictorial illustration of an exemplary disclosed fluid tank.

FIG. 1 illustrates an exemplary fluid tank 10. The fluid tank 10 may be mounted on a mobile machine (not shown) and supply a liquid or gaseous fluid for fuel, lubrication, cooling, work tool operation, or for any other purpose to one or more systems of the machine.

The fluid tank 10 may have any shape suitable for storage of fluid. For example, as shown in FIG. 1, the fluid tank 10 may be generally cubic. The fluid tank 10 may include a generally planar top member 20 and a generally planar bottom member 21. The top member 20 and bottom member 21 may be substantially parallel and separated by side members 22, 24 and two additional side members (not shown), substantially parallel to the side members 22, 24, respectively. The side members 22, 24 may each be substantially perpendicular to each other, to the top member 20, and to the bottom member 21. In an exemplary embodiment, the members may be formed from steel, aluminum, or any other material known in the art suitable for storing a fluid material and may be, for example, about 1.2 mm thick.

Figure 2:
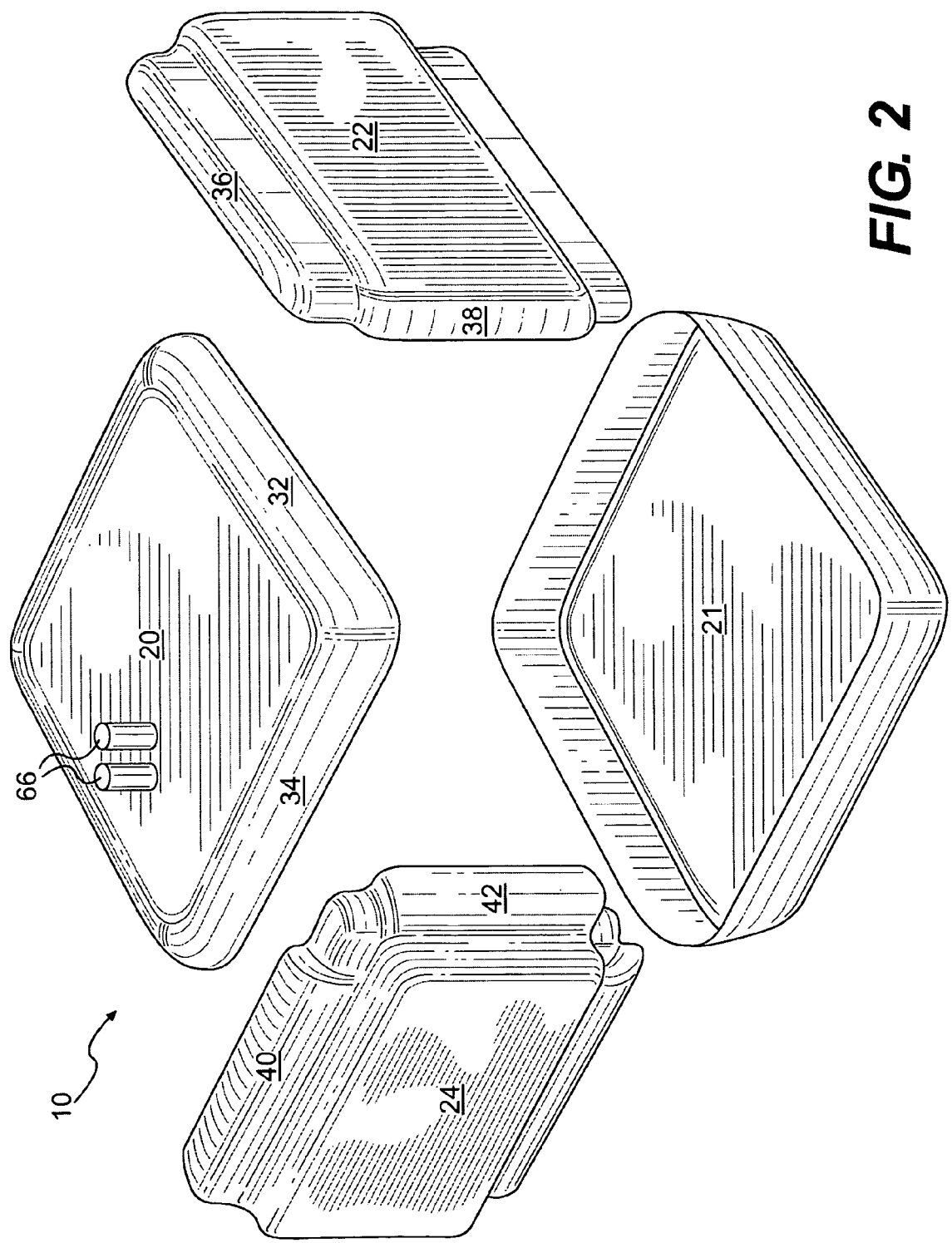
FIG. 2 is an exploded view of the fluid tank of FIG. 1.

Referring to FIG. 2, the top member 20 may include curved mating features 32 and 34. Side member 22 may include curved mating features 36 and 38. Side member 24 may include curved mating features 40 and 42. Each curved mating features in a pair (e.g. 32 and 34) may be adjoining and generally non-planer to the other. The curved mating features 32, 34, 36, 38, 40, 42, the top member 20 and side members 22, 24 may each include two additional mating features. The additional mating features may be similar to those shown in FIG. 2, for example, the additional mating features of the top member 20 may be generally configured as mirror images of the mating features 32 and 34, respectively. The curved mating features 32, 34, 36, 38, 42, may be formed by a process such as, bending on a hydraulic press or deep drawing. It is further contemplated that the members 20, 21, 22, 24 may be formed by forging or by die casting of aluminum, magnesium, or zinc.

Figure 4:
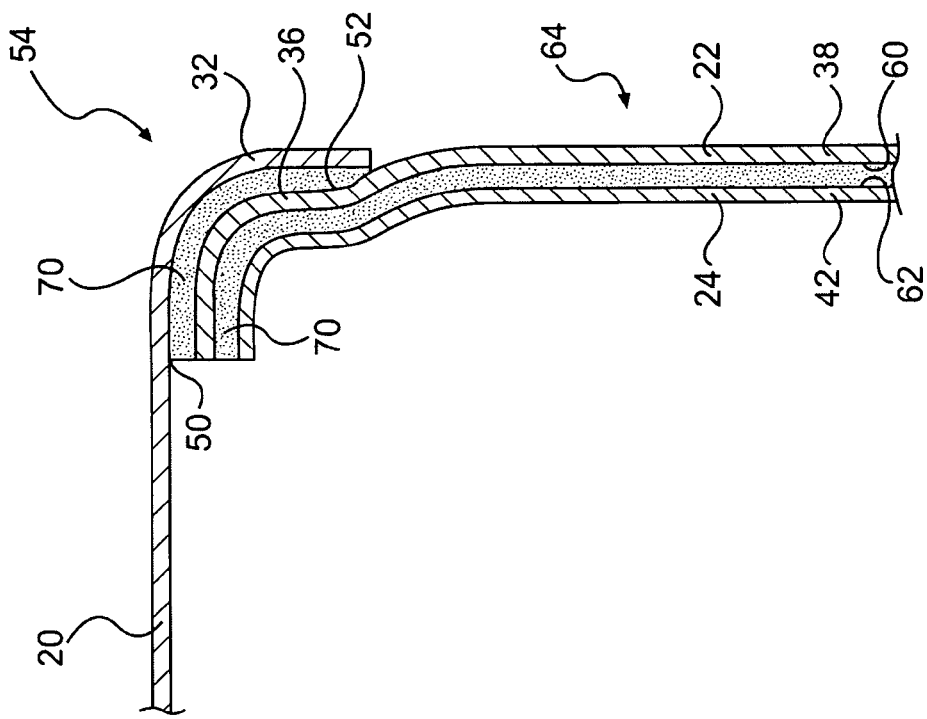
FIG. 4 is cross-sectional illustration of another joint associated with the fluid tank of FIG. 1, taken along the line 4-4 of FIG. 1.
Figure 3:
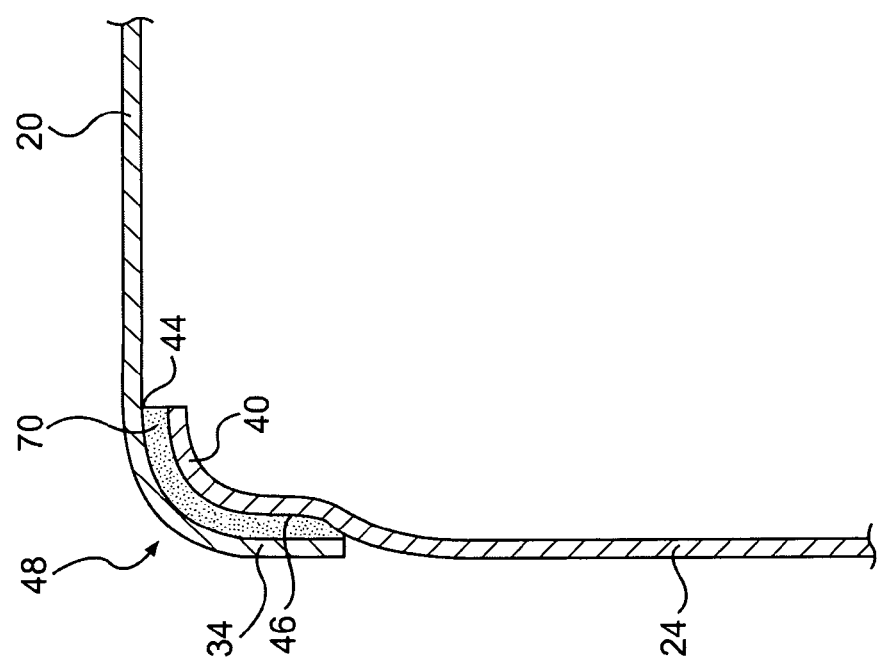
FIG. 3 is a cross-sectional illustration of a joint associated with the fluid tank of FIG. 1, taken along the line 3-3 of FIG. 1.

FIGS. 3 and 4 illustrate cross-sectional views of the fluid tank 10, taken along the lines 3-3 and 4-4, respectively. The curved mating features 32 and 34 may be configured so that when assembled, the curved mating features 32 and 34 generally overlap and engage the curved mating features 36 and 40, respectively. For example, an inner surface 44 of the curved feature 34 may be generally parallel to an outer surface 46 of the mating feature 40 of the side member 24 and form a lap joint 48 (referring to FIG. 3). An inner surface 50 of the curved mating feature 32 may be generally parallel to an outer surface 52 of the curved mating feature 36 to form a lap joint 54 (referring to FIG. 4). In addition, the curved mating feature 38 may be configured to generally overlap the curved mating feature 42 so that when assembled, an inner surface 60 of the curved mating feature 38 and an outer surface 62 of the curved mating feature 42 are generally parallel and form a lap joint 64 (referring to FIG. 4). Although only three lap joints are described in detail here, the remaining joints may be configured in a manner similar to that described above. It is further considered that the fluid tank 10 may include additional features 66 for receiving and providing a fluid flow and that the members forming the fluid tank 10 may have any other configuration that enables the formation of lap joints.

Flexible strips of a heat-activated adhesive 70 may be positioned between the overlapping surfaces of the top member 20 and side members 22, 24 to form a bonded joint between adjacent members. The strips of adhesive 70 may have substantially the same size and shape as the area of the surfaces to be joined (e.g., 44, 46, 50, 52, 60, 62). The heat-activated adhesive 70 may be a rubber material that is non-tacky at a temperature below its flow point temperature. That is, the adhesive 70 may not adhere to itself or other substrates without the application of heat and pressure. The adhesive 70 may have a flow point at a temperature between about 250-275° F., and cure and bond at about 300-325° F. to form a structural bond. Once the structural bond is formed, it may be maintained when the adhesive 70 is returned to a temperature below the flow point temperature and may be maintained when exposed to temperatures at or above the bonding temperature.

The adhesive 70 may be formulated with hydrogenated nitrile butadiene rubber (HNBR), hydrogenated carboxylated nitrile butadiene rubber (HXNBR), nitrile butadiene rubber (NBR), or carboxylated nitrile butadiene rubber (XNBR) compounded with metal acrylates or metal methacrylates such as zinc-diacrylate to provide adhesion. The compound may include a coagent that may react primarily through a radical addition mechanism that generates substantially no gaseous by-products. The coagent may prevent pore formation during curing, which, if formed, may result in decreased material strength. For example, the strength of the adhesive 70 formed by the above materials may exceed 15 MPa, whereas the strength of the adhesive using a foaming coagent would be reduced by an amount proportional to the increase in material porosity caused by the foaming coagent. Examples of non-foaming coagents include N,N'-m-phenylene dimaleimide (HVA-2), trimethylolpropane triacrylate (TMPTA, Sartomer SR351) and Sartomer SR522D. The adhesive 70 may include a peroxide curative selected to disassociate to form reactive radicals. Examples of applicable peroxides include 1,1-bis(t-butylperoxy)3,3,5-trimethylcyclohexane (R.T. Vanderbilt Varox 231), dicumyl peroxide (R.T. Vanderbilt Varox DCP), or n-butyl-4,4-bis(t-butyl-peroxy)valerate and (R.T. Vanderbilt Varox 230 XL). The adhesive 70 may be capable of elongations greater than 100%, thus the adhesive 70 may allow for relative movement between the members forming the joint.

Industrial Applicability

The disclosed fluid tank may be suitable for any mobile machine. Specifically, because the disclosed fluid tank may include joints capable of elongation, the integrity of the tank may be maintained, even when the machine is subject to excessive terrain-induced vibrations. In addition, because the disclosed fluid tank does not include welded joints, the weight and cost of the fuel tank may be reduced. Furthermore, because the adhesive used to form the disclosed fluid tank may be non-tacky at temperatures below about 250° F., it may be relatively easy to work with in a manufacturing environment.

The fluid tank 10 may be assembled by positioning one or more pieces of the adhesive 70 between the curved mating surfaces to be bonded. For example, referring to FIG. 3, the adhesive 70 may be positioned between the curved mating features 34 and 40 of the members 20 and 24, respectively. The adhesive 70 may have substantially the same shape and area as the overlapping areas of the curved mating features 34 and 40. Because the adhesive 70 may be neither liquid nor tacky at temperatures below its flow point temperature of about 250-275° F., it may be easy to handle in a manufacturing environment (e.g., the adhesive 70 may not inadvertently stick to a user or component). After the adhesive 70 is placed between the curved mating features 34 and 40, it may be heated to its flow point temperature. The heating may be achieved via an induction heating method or oven, or any other method known in the art. Because the adhesive has a high viscosity elastomer as a primary constituent it may not exhibit undesirably high flow rates typical of conventional structural adhesives (that rely on fillers to build viscosity).

The adhesive 70 may then be heated to a temperature above its flow point temperature so that it may cure and bond to form a structural bond between the curved mating features 34 and 40. For example, the adhesive 70 may be heated to about 300-325° F. At this elevated temperature, the adhesive 70 may chemically bond with the adjacent surfaces (i.e. the inner surface 44 and the outer surface 46) to form a structural bond that may be maintained when the adhesive 70 is returned to a temperature below the its flow point temperature and is not lost when exposed to temperatures at or above the bonding temperature. Because the adhesive 70 may have substantially the same area as the overlapping surfaces, the lap joint formed by this method may have a relatively large bond area compared to a joint formed by conventional welding methods. The increased bond area may result in a total adhesive bond strength that is substantially equivalent to, or greater than, the strength of the sides of the fluid tank 10, thereby reducing the likelihood of structural failure at the joint.

The fluid tank 10 of the present disclosure may be assembled with a lightweight adhesive 70 that is neither liquid nor tacky in a manufacturing environment and therefore easy to work with. In addition, because the adhesive 70 may be capable of elongations greater than 100%, it may allow for relative movement between the members forming the joint due to vibration, thermal mismatch, and alignment issues that a rigid attachment, such as welding, may not. Furthermore, the fluid tank 10 may have a bond area greater than may be achieved with conventional welding methods, thereby increasing the bond strength between the walls of the fluid tank 10.

What is claimed is:

1. A fluid tank, comprising:
 a first member having a first planar surface and a first curved mating feature extending from the first planar surface, the first curved mating feature having a width greater than a width of the first planar surface;
 a second member having a second planar surface and a second curved mating feature extending from the second planar surface, the second curved mating feature having a width less than a width of the second planar surface;
 the first curved mating feature overlapping and engaging the second curved mating feature to form at least one joint including an adhesive that is non-tacky at a first temperature, has a flow point temperature at a second temperature that is greater than the first temperature, and a cure and bond temperature at a third temperature.

2. The fluid tank of claim 1, wherein a bond formed at the third temperature is maintained after the adhesive is returned to the first temperature and is not lost when exposed to temperatures at or above the third temperature.

3. The fluid tank of claim 1, wherein the third temperature is greater than the second temperature.

4. The fluid tank of claim 3, wherein the second temperature is about 250-275° F.

5. The fluid tank of claim 4, wherein the third temperature is about 300-325° F.

6. The fluid tank of claim 2, wherein the joint includes two or more surfaces having an overlapping area and the adhesive forms a bond across substantially all the overlapping area.

7. The fluid tank of claim 1, wherein the adhesive includes at least one of hydrogenated nitrile butadiene rubber, hydrogenated carboxylated nitrile butadiene rubber, nitrile butadiene rubber, or carboxylated nitrile butadiene rubber.

8. The fluid tank of claim 1, wherein the adhesive includes hydrogenated carboxylated nitrile butadiene rubber, hydrogenated nitrile butadiene rubber, or a blend of both compounded with zinc-diacrylate.

9. The fluid tank of claim 1, wherein the adhesive includes carboxylated nitrile butadiene rubber, nitrile butadiene rubber, or a blend of both compounded with zinc-diacrylate.

10. The fluid tank of claim 1, wherein the adhesive includes a coagent that reacts primarily through a radical addition mechanism this is substantially free of gaseous byproducts.

11. A fluid tank, comprising:
a first member;
a second member;
a third member;
a first joint including an adhesive that is non-tacky at a temperature below a flow point temperature of the adhesive and forms a first structure bond between the first and second members; and
a second joint including an adhesive that is non-tacky at a temperature below a flow point temperature of the adhesive and forms a second structure bond between the first and third members and a third structure bond between the second and third members, the third member disposed between the first and second members at the second joint.

12. The fluid tank of claim 11, wherein the flow point temperature of the adhesive is between about 250-275° F.

13. The fluid tank of claim 11, wherein the adhesive has a cure and bonding temperature between about 300-325° F.

14. The fluid tank of claim 11, wherein the adhesive includes hydrogenated carboxylated nitrile butadiene rubber, hydrogenated nitrile butadiene rubber, or a blend of both and zinc-diacrylate.

15. The fluid tank of claim 11, wherein the adhesive includes carboxylated nitrile butadiene rubber, nitrile butadiene rubber, or a blend of both compounded with zinc-diacrylate.

16. The fluid tank of claim 11, wherein the first and second members each include at least one curved mating feature and the first structure bond formed between the first and second members is formed between the curved mating features of the first and second members.

17. The fluid tank of claim 11, further including a third joint including an adhesive that is non-tacky at a temperature below a flow point temperature of the adhesive and forms a fourth structure bond between the second and third members.

* * * * *